United States Patent
Tran et al.

(10) Patent No.: US 10,032,072 B1
(45) Date of Patent: Jul. 24, 2018

(54) TEXT RECOGNITION AND LOCALIZATION WITH DEEP LEARNING

(71) Applicant: A9.com, Inc., Palo Alto, CA (US)

(72) Inventors: Son Dinh Tran, Sunnyvale, CA (US); R. Manmatha, San Francisco, CA (US)

(73) Assignee: A9.com, Inc., Palo Alto, CA (US)

( * ) Notice: Subject to any disclaimer, the term of this patent is extended or adjusted under 35 U.S.C. 154(b) by 31 days.

(21) Appl. No.: 15/188,792

(22) Filed: Jun. 21, 2016

(51) Int. Cl.
*G06K 9/00* (2006.01)
*G06F 17/21* (2006.01)
(Continued)

(52) U.S. Cl.
CPC ........ *G06K 9/00442* (2013.01); *G06F 17/211* (2013.01); *G06T 7/0081* (2013.01); *H04N 5/23229* (2013.01)

(58) Field of Classification Search
CPC .......... G06K 2209/01; G06K 9/00422; G06K 9/00409; G06K 9/00402; G06K 9/00; G06K 9/00442; G06K 9/00852; G06K 9/00859; G06K 9/344; G06K 9/00456; G06K 9/00879; G06K 9/00979; G06K 9/3233; G06F 3/04883; G06F 17/3061; G06F 17/30864; G06F 17/211; G06N 99/005; G06N 3/0454; G06N 3/08; G06T 2207/20084; G06T 7/0081; H04N 5/23229
See application file for complete search history.

(56) References Cited

U.S. PATENT DOCUMENTS

| | | | | |
|---|---|---|---|---|
| 5,912,986 A | * | 6/1999 | Shustorovich | G06K 9/32 382/156 |
| 6,028,956 A | * | 2/2000 | Shustorovich | G06K 9/3233 382/156 |

(Continued)

OTHER PUBLICATIONS

O. Alsharif and J. Pineau. End-to-end recognition with dybrid hmm maxout models. *ArXiv preprint arXiv*:1310.1811, 2013.
(Continued)

*Primary Examiner* — Kenny Cese
(74) *Attorney, Agent, or Firm* — Hogan Lovells US LLP

(57) ABSTRACT

Approaches provide for identifying text represented in image data as well as determining a location or region of the image data that includes the text represented in the image data. For example, a camera of a computing device can be used to capture a live camera view of one or more items. The live camera view can be presented to the user on a display screen of the computing device. An application executing on the computing device or at least in communication with the computing device can analyze the image data of the live camera view to identify text represented in the image data as well as determine locations or regions of the image that include the representations. For example, one such recognition approach includes a region proposal process to generate a plurality of candidate bounding boxes, a region filtering process to determine a subset of the plurality of candidate bounding boxes, a region refining process to refine the bounding box coordinates to more accurately fit the identified text, a text recognizer process to recognize words in the refined bounding boxes, and a post-processing process to suppress overlapping bounding boxes to generate a final set of bounding boxes.

19 Claims, 8 Drawing Sheets

(51) Int. Cl.
*H04N 5/232* (2006.01)
*G06T 1/00* (2006.01)
*G06T 7/00* (2017.01)

(56) References Cited

U.S. PATENT DOCUMENTS

| | | | | |
|---|---|---|---|---|
| 2006/0291727 A1* | 12/2006 | Bargeron | ........... | G06K 9/00442 382/218 |
| 2015/0269431 A1* | 9/2015 | Haji | ................. | G06K 9/00879 382/186 |
| 2015/0339525 A1* | 11/2015 | Marcelli | ........... | G06K 9/00416 382/161 |
| 2017/0262433 A1* | 9/2017 | Chester | ............... | G06F 17/2827 |

OTHER PUBLICATIONS

M. Busta, L. Neumann, and J. Matas. Fastext: Efficient unconstrained scene text detector. In *Proceedings of the IEEE International Conference on computer vision*, pp. 1206-1214, 2015.
M.-M. Cheng, Z. Zhang, W.-Y. Lin, and P. Torr. Bing: Binarized normed gradients for objectness estimation at 300fps. In CVPR, Jun. 2014.
B. Epshetein, E. Ofek, and Y. Wexler. Detecting text in natural scenes with stroke width transform. In *Computer Vision and Pattern Recognition (CVPR), 2010 IEEE Conference on*, pp. 2963-2970, Jun. 2010.
D. Erhan, C. Szegedy, A. Toshev, and D. Anguelov, Scalable object detection using deep neural networks. In *CVPR*, pp. 2147-2154, 2014.
R. Girshick, J. Donahue, T. Darrell, and J. Malik. Region-based convolutional networks for accurate object detection and segmentation. *Pattern Analysis and Machine Intelligence, IEEE Transactions on*, 38(1):142-158, 2015.
K. He, X. Zhang, S. Ren, and J. Sun. Delving deep into rectifiers: Surpassing human-level performance on imagenet classification. *CoRR*, abs/1502.01852, 2015.
P. He, W. Huang, Y. Qiao, C. C. Loy, and X. Tang, Reading scene text in deep convolutional sequences. *CoRR*, abs/1506.04395, 2015.
J. Hosang, R. Benenson, P. Dollar, and B. Schiele, What makes for effective detection proposals? *Pattern Analysis and Machine Intelligence, IEEE Transactions on*, 2015.
M. Jaderberg, K. Simonyan, A. Vedaldi, and A. Zisserman. Reading text in the wild with convolutional neural networks. *International Journal of Computer Vision*, 116(1): 1-20, 2016.
P. Krahenbuhl and V. Koltun. Geodesic object proposals. In *ECCV*, pp. 725-739. Springer, 2014.
A. Krizhevsky, I. Sutskever, and G. E. Hinton. Imagenet classification with deep convolutional neural networks. In *Advances in neural information processing systems*, pp. 1097-1105, 2012.
S. Lucas, A. Panaretos, L. Sosa, A. Tang, S. Wong, and R. Young. Icdar 2003 robust reading competitions. In *ICDAR*, 2003.
J. Matas, O. Chum, M. Urban, and T. Pajdla. Robust wide-baseline stereo from maximally stable external regions. *Image and vision computing*, 22(10):761-767, 2004.
L. Neumann and J. Matas. Real-time scene text localization and recognition. In *Computer Vision and Pattern Recognition (DVPR), 2012 IEEE Conference on*, pp. 3538-3545. IEEE, 2012.
T. Wang, D. J. Wu, A. Coates, and A. Y. Ng. End-to-end text recognition with convolutional neural networks. In *ICPR*, pp. 3304-3308. IEEE, 2012.
V. Wu, R. Manmatha, and E. M. Riseman. Textfinder: An automatic system to detect and recognize text in images. *Pattern Analysis and Machine Intelligence, IEEE Transactions on*, 21(11):1224-1229, 1999.
C. L. Zitnick and P. Dollar. Edge Boxes: Locating object proposals from edges. In *ECCV*, pp. 391-405.

* cited by examiner

TEXT RECOGNITION AND LOCALIZATION WITH DEEP LEARNING

BACKGROUND

Users are increasingly utilizing electronic devices to obtain various types of information. For example, a user wanting to purchase a product might access an electronic marketplace in order to search the types of products offered through that marketplace. Unless the user knows an exact brand or style of product that the user wants, however, the user might have to search through hundreds or thousands of different products using various options to attempt to locate the type of product in which the user is interested. If the user is interested in a product of a specific type, the user might have no option but to sift through these results, potentially only being able to narrow the results by price, ratings, availability, or other such options. In some situations, a user interested in acquiring information about a product can capture an image of the product and submit the captured image to an object recognition system to obtain information associated with the product. However, conventional object recognition approaches may not be able to successfully and/or quickly identify objects. In either situation, the process can be time consuming and potentially frustrating for a user, which can result in the user not locating an item of interest and the marketplace not completing a transaction.

BRIEF DESCRIPTION OF THE DRAWINGS

Various embodiments in accordance with the present disclosure will be described with reference to the drawings, in which.

DETAILED DESCRIPTION

Figure 1A:
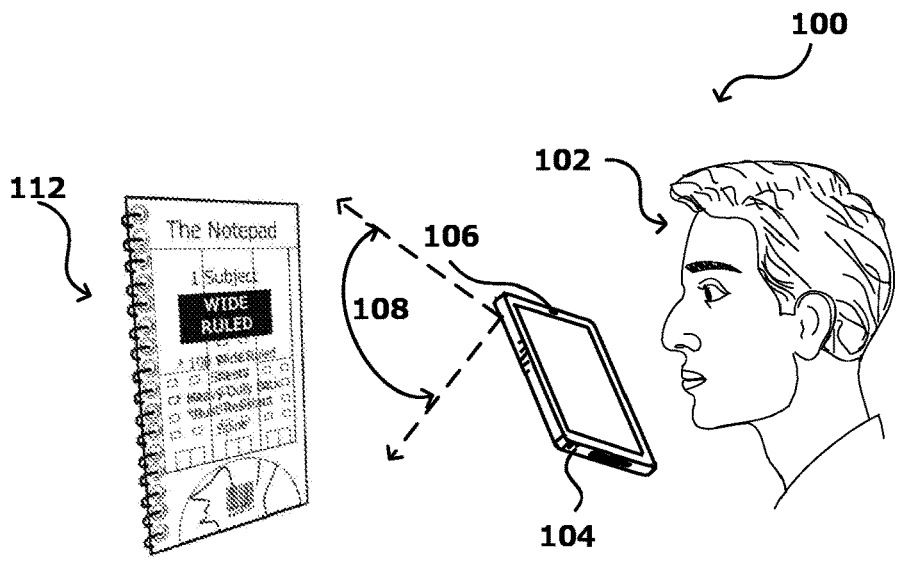
FIGS. 1A and 1B illustrate an example process in which a user can attempt to capture an image in an attempt to locate information about an item in accordance with various embodiments.

Systems and methods in accordance with various embodiments of the present disclosure overcome one or more of the above-referenced and other deficiencies in conventional approaches to identifying objects using an electronic device. In particular, various embodiments provide for identifying text represented in image data as well as determining a location or region of the image data that includes the text represented in the image data. For example, a camera of a computing device can be used to capture a live camera view of one or more items. The live camera view can be presented to the user on a display screen of the computing device. An application executing on the computing device (or at least in communication with the computing device) can analyze the image data of the live camera view to identify text represented in the image data as well as determine locations or regions of the image that include the representations. As will be described further herein, one such recognition approach includes a region proposal process to generate a plurality of candidate bounding boxes, a region filtering process to determine a subset of the plurality of candidate bounding boxes, a region refining process to refine the bounding box coordinates to more accurately fit the identified text, a text recognizer process to recognize words in the refined bounding boxes, and a post-processing process to suppress overlapping words to generate a final set of words.

In accordance with various embodiments, the set of bounding boxes or graphical outlines that include respective identified text can be displayed overlaying an image generated using the image data. The bounding boxes can be associated with a label or other indicator that includes words within the bounding box. A selection of a bounding box (or words within the bounding box) can be received and the words within the bounding box can be used to submit a query. The query word can be compared to stored words to determine a matching word (or words), where each matching word can be associated with a product(s) available for purchase from an electronic marketplace. A product listing associated with the product(s) can be determined and displayed to a user. If the user wants a different set of product listings, the user can select a different bounding box corresponding to another word, which can cause a new query to be executed with the word in the new selected bounding box to obtain a new set of product listings. Various other types of results can be returned as well as known for such purposes. Upon receiving, from the user, a touch (or other) selection to a product listing, additional information for the associated product(s) can be displayed, enabling the user to learn more about and/or purchase the product from the electronic marketplace through the portable computing device, among other such options.

Various other functions and advantages are described and suggested below as may be provided in accordance with the various embodiments.

Figure 1B:
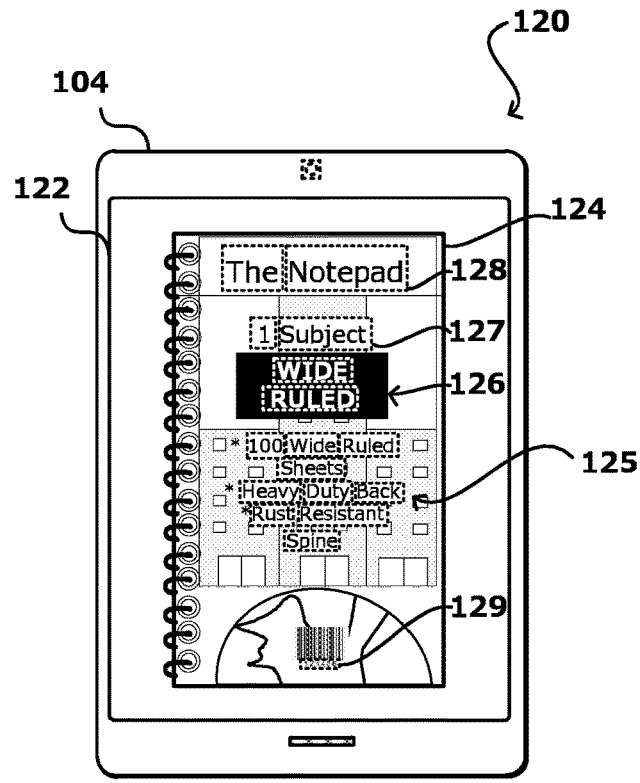

FIG. 1 illustrates an example situation 100 in which a user 102 is attempting to locate information for an item 112 in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more items of interest 112 are within a field of view 108 of at least one camera 106 on the computing device. The camera might capture video, such that a "live" view of the captured video information can be displayed on a display screen 122 of the computing device 104, as illustrated in the example situation 120 of FIG. 1B. In other embodiments, the camera might capture a still image 124 showing a representation of the item(s) of interest. In at least some embodiments, the image and/or a frame of the video can be analyzed, such as by analyzing on the device or uploading across a network to a service for analyzing image content.

In accordance with various embodiments, attempting to recognize text (e.g., 125-129) based on a mobile query image such as that illustrated in FIG. 1B can be difficult and extremely resource intensive. For example, as shown, the text is overlaid on an image of buildings, which for conventional text recognition approaches can result in low quality recognition results. Further, optical character recognition (OCR) approaches have traditionally involved recognizing text printed against white or plain backgrounds. In situations where text recognition is needed against image backgrounds, such as the one illustrated in FIGS. 1A and 1B, such traditional approaches can be difficulty and resource intensive. Examples include street signs, text printed on magazine covers or photographs, text in videos. In either situation, the process can be time consuming and potentially frustrating for a user, which can result in the user not locating an item of interest and the marketplace not completing a transaction.

Accordingly, approaches in accordance with the various embodiments provide for recognizing text represented in image data as well as determining a region or portion of the image that includes the representation of the text. Various approaches enable the user to specify the type of item for which the user is searching, for example, by selecting text identified by their bounding box or other graphical outline or label. In order to enable the user to quickly and easily cause such actions to be performed, image analysis algorithms that exploit deep neural networks used in localization pipelines for image recognition and other such approaches can be used. In the embodiments described herein, the initial stages can be sequential and the final portion of the system can iterate between several stages. For example, the first stage can include a region proposal step where a large number of proposals (e.g., bounding boxes) are generated for possible text regions in the image. This step may identify many proposals, and subsequent stages are designed to increase the precision by reducing the number of proposals without lowering the recall. In some examples, the proposals are generated using both MSER (maximally stable extremal regions) and BING. In the next step, many of these proposals are filtered using a convolutional neural network (CNN) with a regression (Euclidean) loss and a SoftMax loss function. The location of these filtered bounding boxes are then refined using regression CNNs. The refinement is done with several recursive iterations. A classification CNN is then used to map the bounding boxes to words in a large (e.g., 90K words) predefined dictionary. Because the resulting predictions might contain a lot of overlapping and duplicated recognized text (e.g., at the same location there might be multiple overlapping results), a post-processing step can be implemented to merge and clean up the recognition results. The post processing step can include several stages. It starts with a non-maximum suppression with boundary refinement. The boundary refinement is done using bounding box regression but by expanding only the ends of the words rather than the entire word. Next, the word recognition is rerun to improve the labeling. Finally, a grouping is performed to eliminate words contained within other words. Thereafter, a selection can be received and information relating to the selected text can be determined. The information can be used to determine a matching item or items, where each matching item can be associated with a product available for purchase from an electronic marketplace. A product listing associated with the product(s) can be determined and displayed to a user.

Figure 2:
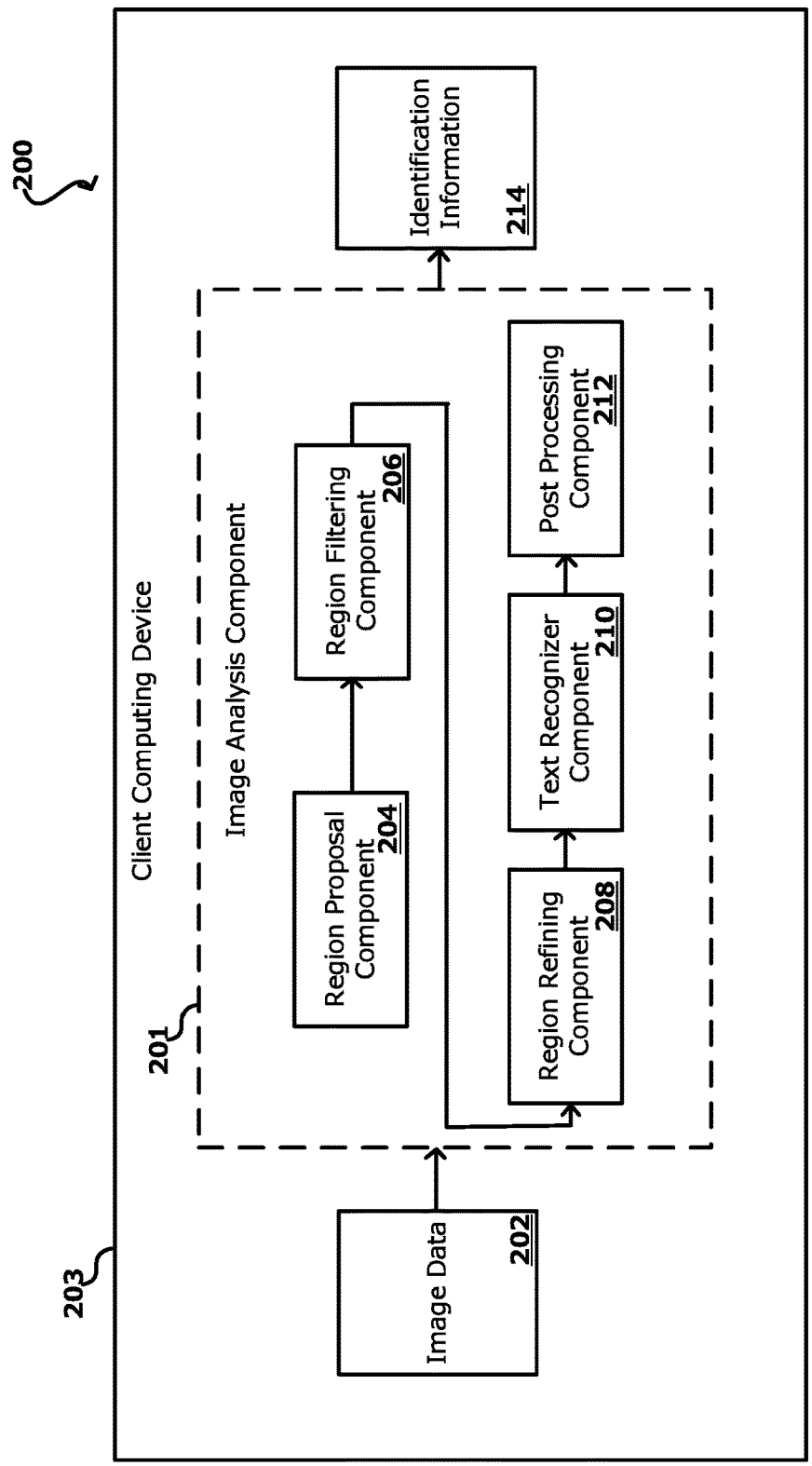
FIG. 2 illustrates an example system for text localization in accordance with an embodiment.

FIG. 2 illustrates an example system 200 for text localization in accordance with an embodiment. It should be understood that text localization includes, for example, recognizing text represented in image data, determining a region or portion of the image that includes the representation of the text, and generating a label that includes words for the text recognized. In this example, a user is using a camera of a computing device 203 to capture image data 202 of a live camera view of one or more items. The items in this example include text thereon. It should be noted that in various embodiments the image data can be downloaded to the computing device. As described, the image data can be analyzed to attempt to recognize text, and in response to determining text as being associated with a product at least viewable through an electronic marketplace, for example, product listings associated with the product can be determined and displayed on the computing device. In accordance with various embodiments, the image data can be analyzed using software or a set of software components as may include an image analysis module 201 executing on the computing device (or in communication with the computing device). The image analysis module can include one or more software components. As shown in FIG. 2, the image analysis component includes a region proposal component 204 to generate a plurality of candidate bounding boxes, a region filtering component 206 to determine a subset of the plurality of candidate bounding boxes, a region refining component 208 to refine the bounding box coordinates to more accurately fit the identified text, a text recognizer component 210 to recognize words in the refined bounding boxes, and a post-processing component 212 to suppress overlapping words to generate a final set of words.

The region proposal component 204 can be configured to analyze the image data 202 to generate a plurality of candidate bounding boxes (or overlapping regions of interest). The bounding boxes are candidate bounding boxes because some boxes may be filtered as will be described further herein. In accordance with various embodiments, various detection proposals can be implemented by the region proposal component as would be understood to those skilled in the art. For example, a combination of general object region proposals and text-specific region proposals can be implemented. Example region proposals include geodesic object proposals (GOP), binarized normed gradients (BING), EdgeBoxes, maximally stable extremal regions (MSER), among other such approaches. In accordance with various embodiments, the general object region proposals and text-specific region proposals can be trained on one or more object detection datasets and text detection data sets respectively, and the parameters of the proposals can be chosen such that chosen proposals produce a predetermined number of candidate bounding boxes per image. An example number of candidate bounding boxes can be six thousand.

In a first step, the region proposal component 204 can use a general object region proposal to determine a first set of candidate bounding boxes for the received image. For example, in the situation where BING or another similar approach is used, the default model can be trained using one or a number of object detection datasets (e.g., Pascal VOC07), and the parameters of the default model can be selected to produce a predetermined number of candidate bounding boxes (e.g., around five thousand). In this example, the predetermined number of candidate bounding boxes corresponds to the first set of candidate bounding boxes. In a second step, the region proposal component can use a text-specific or other word region proposal approach to generate a second set of candidate bounding boxes. The first and second set of candidate bounding boxes can be combined to generate the plurality of candidate bounding boxes.

In accordance with some embodiments, in the situation where MSER or another similar approach is used, the original MSER can be applied to generate a set of basic candidate bounding boxes. In accordance with various embodiments, the set of basic candidate bounding boxes can include a full letter or parts of a letter. Similarity distances between these basic candidate bounding boxes can be calculated based on their similarity in size, shape and location. A resulting distance matrix can be used with a bottom-up hierarchical clustering process to generate a clustering tree. In this tree, letters in a word can be grouped together and cutting off the tree with a diameter threshold can generate a set of word proposals. To cover different scales, multiple thresholds can be used. In various embodiments, to cover different text orientations, multiple distance matrices, each with an emphasis on a given main direction can be used to create multiple trees. The second set of candidate bounding boxes is the combination of all resulting ones from different trees using different thresholds, which can be around one thousand bounding boxes.

The region filtering component 206 can be configured to determine a subset of the plurality of candidate bounding boxes and thus reduce the number of candidate bounding boxes. For example, in various embodiments, many candidate bounding boxes do not contain text and in at least some embodiments, a neural network can be trained to recognize bounding boxes that do not contain text to filter out such bounding boxes. Neural networks (NNs), such as convolutional neural networks, are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. NNs exploit spatially-local correlation by enforcing a local connectivity pattern between nodes of adjacent layers of the network. Different layers of the network can be composed for different purposes, such as convolution and sub-sampling. In one example there is an input layer which along with a set of adjacent layers forms the convolution portion of the example network. The bottom layer of the convolution layer, along with the lower layer and output layer, make up the fully connected portion of the network. From the input layer, a number of output values can be determined from the output layer, which can include several items determined to be related to an input item, among other such options. NN is trained on a similar data set (which includes bounding boxes with text, bounding boxes with no text, etc.), so the network can learn the best feature representation for this type of image. Trained NN can be used as a feature extractor: an input image can be passed through the network and intermediate layer outputs can be used as feature descriptor of the input image. The trained NN can then be used to detect bounding boxes that do not contain text.

In at least some embodiments, the trained NN can be a trained multi-task neural network: one task for text/no-text classification and one task for shift regression. As will be described further herein, the shift regression task can be for determining how to shift the bounding box to a more accurate location such that the bounding box actually includes a text. In certain embodiments, the loss layers of the trained multi-task network for the first and second tasks can be Softmax and Euclidean respectively. In this example, both of these loss layers can share the network up to the last fully connected (fc) layer. The rest of the neural network architecture can be as follows (layers in order): (first layer, convolutional layer, 32, 5×5), max pool, (second layer, convolutional layer, 64, 5×5), max pool, (third layer, convolutional layer, 128, 3×3), max pool, (fourth layer, convolutional layer, 256, 3×3), (fifth layer, fully connected layer, 1024), where (first layer, convolutional layer, 32, 3×3) corresponds to a convolution layer with number of kernels 32 and kernel size 3×3 and (fifth layer, fully connected layer, 1024) corresponds to a fully connected layer with 1024 nodes. All pooling layers have kernel size 2×2 and stride two. Extracted areas of the image can be converted to gray scale, normalized to a mean zero, standard deviation one, and resized to 32×96. In accordance with various embodiments, the normalization can also apply to the regression as well as recognition networks described below.

In at least some embodiments, the neural network can be trained using sets of images for specific classifications of text. For example, a neural network might be trained using data from SVT-train and ICDAR03-train. It should be noted that other datasets can be used. In this example, positive samples are random patches that have an intersection over union (IOU) score greater than a predetermined threshold (e.g., 0.5) with a ground truth box while negative samples have IOU less than a predetermined threshold (e.g., 0.1). An IOU score can be determined by taking the intersection of the proposal region with its ground truth region and dividing by the union of the proposal region and ground truth region. At classification time, a threshold is chosen so that a predetermined number of bounding boxes (e.g., 1K) are retained.

The region refining component 208 can be configured to refine the bounding box coordinates to more accurately fit the text represented in the image. Refining the bounding box can include changing a size (e.g., bigger, smaller) of a bounding box, repositioning a bounding box, changing a shape of a bounding box, or a combination thereof. In this example, a regression CNN can be trained using one or more data sets, and the trained CNN is operable to refine the coordinates of the candidate bounding boxes obtained from the region proposal component. For example, the outputs of the region proposal component and region filtering component are normalized coordinates of the top-left and bottom right corners. In this example, Euclidean loss between the predicted and ground truth coordinates can be used. The rest of the network architecture can be, for example: (first layer, convolutional layer, 32, 5×5), max pool, (second layer, convolutional layer, 64, 5×5), max pool, (third layer, convolutional layer, 128, 3×3), max pool, (fourth layer, convolutional layer, 256, 3×3), (fifth layer, fully connected layer, 1024). Pooling layers use kernel 2×2 and stride two. In various embodiments, the input extraction and normalization of bounding box coordinates can performed as follows. In a first phase, given a ground truth bounding box, a random patch with IOU greater than 0 with the ground truth is selected. This patch is then extended by a factor of two to get a better spatial support. The ground truth box's top-left and bottom-right coordinates are then normalized to have origins at the top-left corner and center of the extended patch, p, respectively. The x- and y-axes are scaled by a factor of 1/(p's half width) and 1/(p's half height) respectively. The extended patch and these normalized coordinates are used for training the regression network. In a second phase, in accordance with various embodiments, three CNNs (the input to one being the output of the preceding one) that are trained and operated with the following values of θ and α: (0.5, 0.5), (0.25, 0.25), (0.25, 0.125). The idea is that initially the bounding box coordinates are only roughly aligned with the text and so the first CNN tries to improve this estimate. The CNN's following the first CNN refine this further so they are more constrained. In a third phase, the proposed patch was also extended by a factor of a (same value used for the second phase) and the predicted coordinates are converted back to the image coordinate system.

The text recognizer component 210 is configured to analyze the bounding boxes proposed by the region refining component 208 and can generate a classification vector or other categorization value that indicates the probability that a respective bounding box includes an instance of a certain word. The classification vector can include an entry (i.e., a probability) for each of the categories (e.g., words) the text recognizer component is trained to recognize. In various embodiments, the word recognizer can be a CNN (e.g., a trained word recognition neural network) that maps a bounding box with text to a word in a predefined dictionary. In this example, the output layers size can be the same as the vocabulary size. The network architecture can be as follows: (first layer, CNN layer, 32, 5×5), max pool, (second layer, CNN layer, 64, 5×5), max pool, (third layer, CNN layer, 128, 3×3), max pool, (fourth layer, CNN layer, 256, 3×3), (fifth layer, CNN layer, 256, 3×3), max pool, (sixth layer, fully connected layer, 2048), (seventh layer, fully connected layer, 2048). Max pooling layers can have a kernel 2×2 and a stride of two.

In accordance with various embodiments, the last layer of the network can contain a large number of parameters, for example, around 4K×90K parameters. Directly training a network of this scale is can be resource intensive. Accordingly, an incremental training scheme can be used where the networks output size is increased by a predetermined amount (e.g., 5K) at a time. Such a procedure can include the following. First, a first network with a smaller output layer (e.g., approximately 6K) can be trained to a predetermined accuracy (e.g. >90% recall). Second, all network parameters from the first network can be transferred to a second network (e.g. the 90K-output network) except the one in the output layer. Third, second network is trained with all parameters being frozen except the last layer. Finally, starting with a lower base learning rate, all layers are unfrozen and the network is retrained.

In accordance with various embodiments, synthetic text data can be used to train any one of the CNNs. An example training set can include approximately eight million images with an average of eighty images for each word. The word images can be generated with random font, attributes and background. In various embodiments, the training images can be resized to 32×96 irrespective of word length. This resizing ensures that short words, e.g., "an" have the same size as long words e.g., "congratulation." For example, in accordance with various embodiments, generating synthetic text data can include, for example, first, generating a background layer, where background patches of random sizes can be drawn randomly from a database of images which includes clean simple patterns, smooth transition images, regular textures, natural texture and images. Images from a training set of text can be used or other training data. The background layer can be used as-is or undergo several iterations of blending with each other to get more a diversified mix. These patches are then resized to match the target output size. Second, the foreground text can be generated in the following manner. First a font can be randomly selected from a database of fonts. Then font attributes such as size, color, stroke width styles and kerning, etc. are chosen. Next, if needed, bordering and shadowing can be done at random scales. Before combining with the background layer, the foreground's under color is either randomly set to a certain value or to be transparent. Third, the foreground and background are blended or otherwise merged. Blending between the generated foreground and background is accomplished either by alpha blending or by a composite operation selected from a bank of methods such bump map, colorize, multiply, saturate. In accordance with various embodiments, to model the imaging process's effects, geometric transformations such as perspective projection and arc/cylindrical distortions can be applied to the blended image. Lastly, random noise and compression noise and artifacts can be added into the final image. Other effects can include specular reflection and lighting variation.

In accordance with various embodiments, for the word classification task, for each word in the dictionary, a large number word images with tight bounding box can be generated with a random configuration following the process above. For the bounding box regression task, a page of text which consists of paragraphs and sentences of random words, can be generated. The entire page can undergo the same geometric transformation. To keep track of the accurate location of each word after arbitrary geometric transformation, a parallel process can be used with identical geometric transformations in which each word is distinctively color coded. The location of each word can then recovered based on the color information. In addition, a post-processing step can be employed to filter out words that are not useful for training, e.g. words with the same color as background.

The post processing component 212 can be configured to suppress overlapping words to generate a final set of words. For example, in various embodiments, the output of region proposal filtering component 206 contains a lot of overlapping words. A post processing step can be used to eliminate these duplications. In accordance with various embodiments, the post processing component can perform non-maximum suppression (NMS) of overlapping words. In this example, two kinds of NMS can be used: per-word NMS and cross-word NMS, where NMS can be interleaved with the region refining process. As an example, a variant of bounding box regression called word-end regression can be used. For example, the networks employed are the same, but the extracted regions are only around the two ends of (long) words. In accordance with various embodiments, after several iterations of refinement, the position of the bounding boxes might change. Accordingly, the text recognizer component 210 can be rerun to relabel the bounding boxes. Finally, a grouping step is performed to eliminate words that are contained inside other words.

In accordance with various embodiments, the words recognized in the bounding boxes can be associated with products provided through an electronic marketplace. In response to selecting one of the words, or using a word in a search query, a product listing and/or other identification information 214 associated with the product can be determined and displayed to a user. The product listing can be displayed on an interface of the computing device. An example interface includes a product page. Another example interface includes an augmented reality interface where additional information can be overlaid on the image data of the live camera vie. The interface enables the user to specify that the user is interested in the items associated with recognized words. For example, FIGS. 3A and 3B show two such interfaces.

Figure 3A:
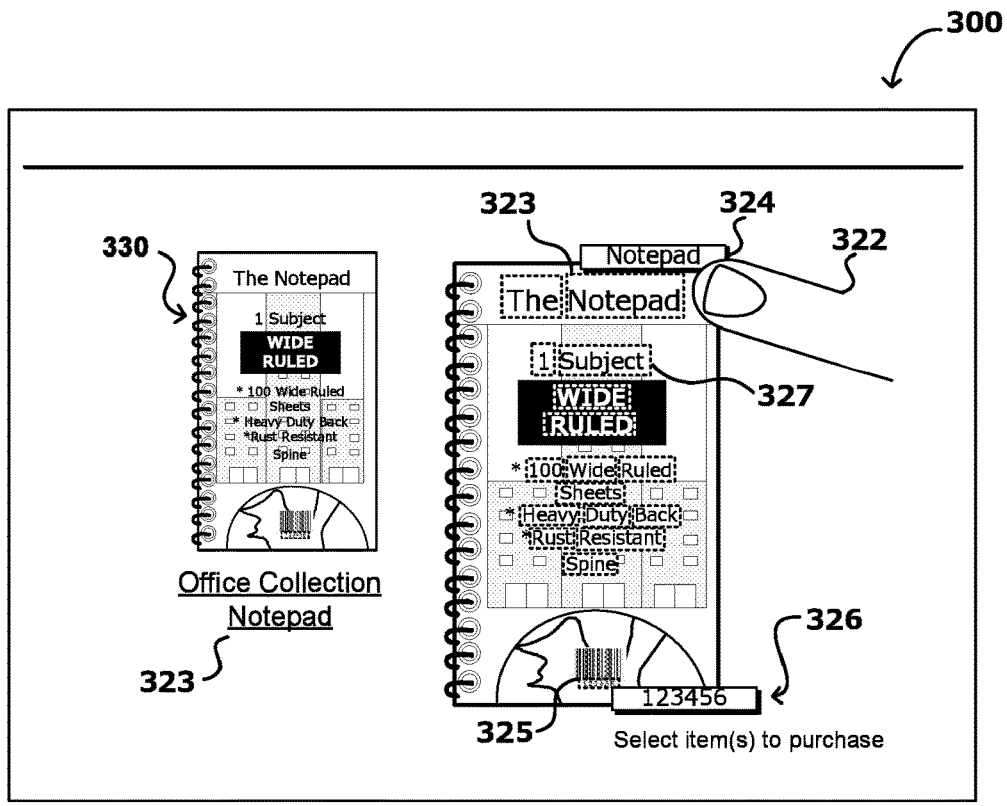
FIGS. 3A and 3B illustrate example interfaces that can enable a user to perform a search in accordance with various embodiments.
Figure 3B:
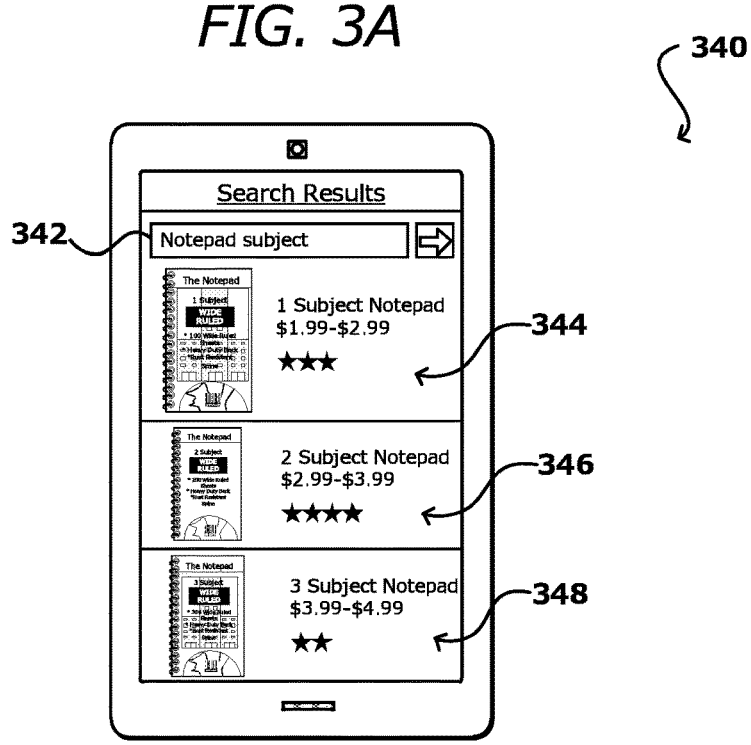

As shown in example 300 of FIG. 3A, words represented in image data of a live camera view (or in some instances captured image data or video data) have been recognized, classified, and localized in accordance with embodiments described herein. A set bounding boxes, graphical outlines, or contours can be provided. The bounding boxes can be displayed on the display screen and in some embodiments can include a label or other indicator of the identified text within the outline. Although bounding boxes are referred to in many examples herein, it should be understood that other types of visual indicators can be used as well, such as contours, point sets, geometric elements, and the like. Also as shown, proximate to some bounding boxes is a respective label that includes word(s) of the text bound in the box. In many embodiments the label might be fixed in position with respect to the bounding box, while in other embodiments the label may be able to move in order to ensure that the label does not block another bounding box or is blocked by the user's finger or other object used to select bounding boxes. In the situation where a label is shown, the label is associated with a product provided through an electronic marketplace or other such entity. When selected, a product page for the product identified by the text in the label can be displayed. In accordance with various embodiments, text that includes a dashed bounding box can, in various embodiments, be selected to be used to search or obtain additional information. Bounding boxes and labels provides the user a clear and straightforward way to view a product page or select or indicate the desired text to which to search or obtain additional information.

As shown in FIG. 3A, label 324 is associated with bounding box 323 that includes the word Notepad, label 326 is associated with bounding box 325 that includes a bar code number. A user (or other person) can select one or more of the labels. As shown, a user's finger 322 selects label 324 associated with bounding box 323. In this example, the user's finger contacts the area of the display screen included in label 324. By selecting a label, a product listing associated with the label can be determined and displayed to a user. For example, as shown in FIG. 3A, a side panel that includes the product listing is provided. The side panel includes a graphical representation 330 of the notepad and a label that can link to additionally information associated with the notepad. It should be noted that although a side panel is used, the additional information can be displayed in an overlay or other graphical representation as is known in the art. Additional labels can be selected, where each additional product associated with a label can be added to the product listing.

As described, one or more bounding boxes can be selected to be used to search or obtain additional information and used in a search for selecting bounding boxes. For example, by selecting a bounding box, the text within the bounding box can be used in a search query to determine matching words, where each matching word can be associated with one or more product(s) available for purchase from an electronic marketplace. As shown in example 340 of FIG. 3B, the user has selected the bounding boxes associated with the words Notepad and subject. In this example, the user's finger contacts the area of the display screen included in bounding box 323 and 327. In response to selecting the bounding boxes, the text in the bounding boxes can be inputted into search field 342. Upon receiving input (e.g., touch) to search using the selected words, the computing device can cause a query to be submitted to a searching service, for example, where the query includes the text. The text used in the query can be matched against keywords or other terms associated with products. As shown in FIG. 3B, in response to submitting the query, search results that include products 344, 346, and 348 can be displayed. In some embodiments, the search results can be displayed on a separate result page or other such display, where the live view are not displayed, in order to enable more search results to be displayed at one time. This can be particularly beneficial for devices such as smart phones or watches that may have a relatively small display. The search results can include additional information for the associated products, enabling the user to learn more about and/or purchase one of the products from the electronic marketplace through the portable computing device, among other such options. The additional information can include a cost of the product, a rating of the product, a description of the product, among other such information. The additional information can be displayed in an overlay, pop-up, in a new interface, or in another application executing on the computing device. In various situations, the user can attempt to purchase the recognized objects. For example, in FIG. 3A, a link or graphical icon can be selected to purchase the selected objects. In FIG. 3B, the user can select one of the displayed products.

Figure 4:
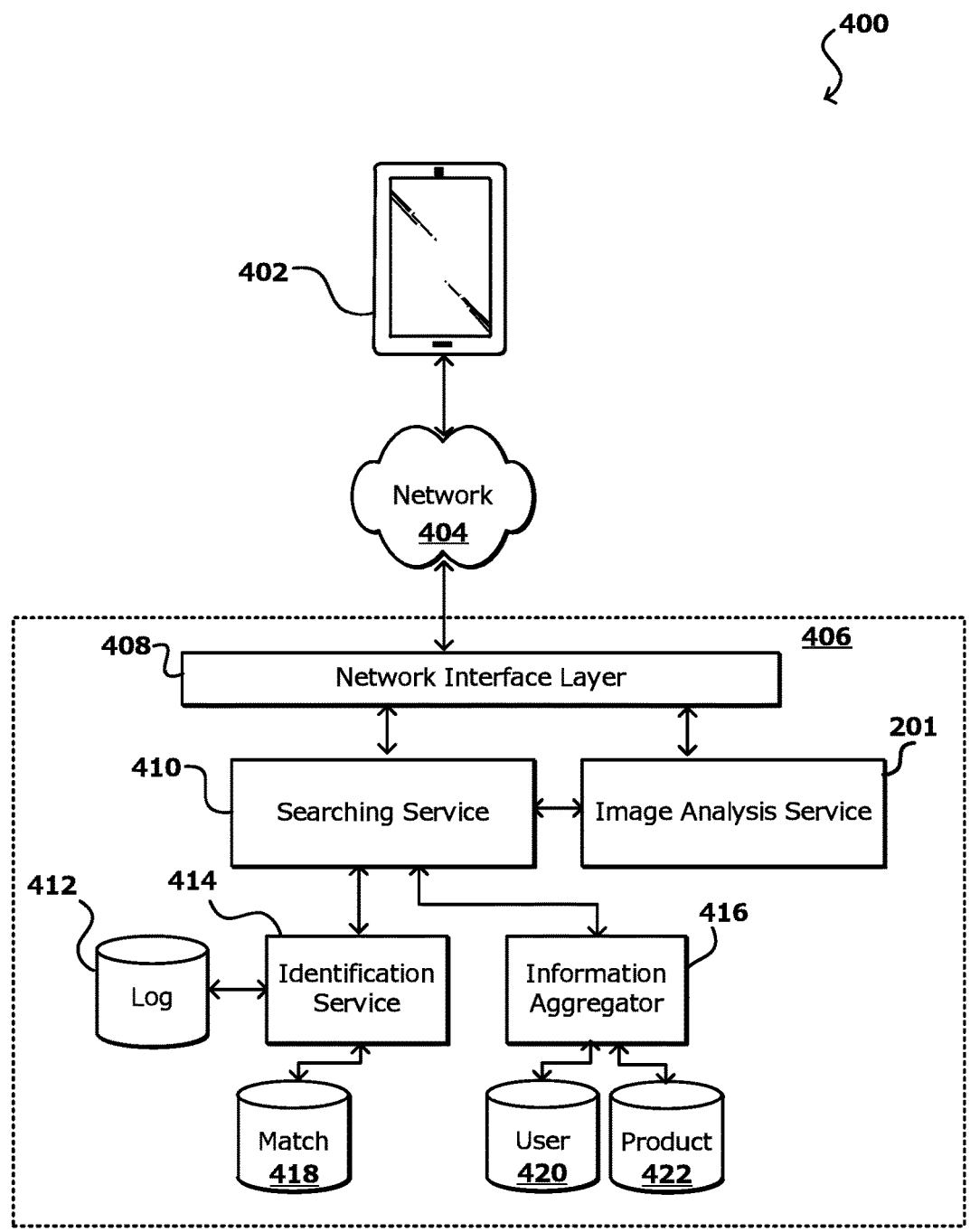
FIG. 4 illustrates example system for identifying items and providing information about those items that can be utilized in accordance with various embodiments.

FIG. 4 illustrates an example environment 400 for text localization in which information can be submitted by a client device in order to attempt to obtain information for matching text as a set of search results or other such content. In this example, a user is able to capture image data of a live camera view of one or more objects that include text using a computing device 402. In various embodiments, the image data can be captured image data (e.g., still images and/or video data) or downloaded image data. An application executing on the computing device (or at least in communication with the computing device) can analyze the image data of the live camera view to recognize any text represented in the image data as well as determine a location or region of the image that includes the representation of the text.

The computing device can send at least a portion of information across at least one appropriate network 404, such as may include the Internet, a local area network (LAN), a cellular network, and the like. The request can be sent to an appropriate content provider 406, as may provide one or more services, systems, or applications for processing such requests.

In this example, the request is received to a network interface layer 408 of the content provider 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request, and cause at least a portion of the information in the request to be directed to an appropriate system or service, such as a searching service 410 and image analysis service 201 as illustrated in FIG. 4. As described, the image analysis service can analyze the image data of the live camera view to determine information that can be used identify text represented in the image data as well as determine locations or regions of the image that include the representations. The image analysis service can utilize deep neural networks used in localization pipelines for image recognition and other such approaches can be used. For example, a first stage can consist of a region proposal step where a large number of proposals (e.g., bounding boxes) are generated for possible text regions in the image. At this point, many proposals are identified, and subsequent stages are designed to increase the precision by reducing the number of proposals without lowering the recall. In the next step, many of these proposals are filtered out using a convolutional neural network (CNN) with a regression (Euclidean) loss and a SoftMax loss function. The location of these filtered bounding boxes are then refined using regression CNNs. The refinement is done with several recursive iterations. A classification CNN is then used to map the bounding boxes to words in a large (e.g., 90K words) predefined dictionary. Because the resulting predictions might contain a lot of overlapping and duplicated recognized text (in other words at the same location there might be multiple overlapping results), a post-processing step can be implemented to merge and clean up the recognition results.

A searching service 410 in this example includes components operable to receive information for recognized text from the image analysis service, analyze the information, and submit queries to a search engine to return information relating to people, products, places, or things that are determined to match the information within at least an acceptable amount of deviation, within an allowable matching threshold, etc. For example, the searching service 410 in this example can cause information to be sent to at least one identification service 414, device, system, search engine, or module that is operable to analyze the information and attempt to locate one or more matches. In at least some embodiments, an identification service 414 will process the information, such as to extract specific words or phrases, then compare the processed data against data stored in a matching data store 418 or other such location. In various embodiments, the identification service utilizes one or more search engines to determine one or more matches. The data in an image matching data store 418 might be indexed and/or processed to facilitate with matching, as is known for such purposes.

The searching service 410 can receive information from each contacted identification service 414 as to whether one or more matches could be found with at least a threshold level of confidence, for example, and can receive any appropriate information for a located potential match. The information from each identification service can be analyzed and/or processed by one or more applications of the searching service, such as to determine data useful in obtaining information for each of the potential matches to provide to the user. For example, a searching service might receive text, phrases, bar codes, product identifiers, or any other types of data from the identification service(s), and might process that data to be provided to a service such as an information aggregator service 416 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 416 can utilize the aggregated data from the searching service 410 to attempt to locate products, in a product data store 422 or other such location, which are offered through the marketplace and that match, or are otherwise related to, the potential match information. For example, if the identification service identifies a matching object, the information aggregator can attempt to determine whether objects of that type are offered through the marketplace, or at least for which information is available through the marketplace. In at least some embodiments, the information aggregator can utilize one or more suggestion algorithms of a search engine or other such approaches to attempt to determine related elements that might be of interest based on the determined matches. In some embodiments, the information aggregator can return various types of data (or metadata) to the searching service, as may include item description, availability, reviews, and the like. In other embodiments, the information aggregator might instead return information such as a product identifier, uniform resource locator (URL), or other such digital entity enabling a browser or other interface on the client device 402 to obtain information for one or more products, etc. The information aggregator can also utilize the aggregated data to obtain various other types of data as well. Information for located matches also can be stored in a user data store 420 of other such location, which can be used to assist in determining future potential matches or suggestions that might be of interest to the user. Various other types of information can be returned as well within the scope of the various embodiments.

The searching service 410 can bundle at least a portion of the information for the potential matches to send to the client as part of one or more messages or responses to the original request. In some embodiments, the information from the identification services might arrive at different times, as different types of information might take longer to analyze, etc. In these cases, the searching service might send multiple messages to the client device as the information becomes available. The potential matches located by the various identification services can be written to a log data store 412 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 406 in FIG. 4, that one or more of these identification services might be operated by third parties that offer these services to the provider.

Figure 5:
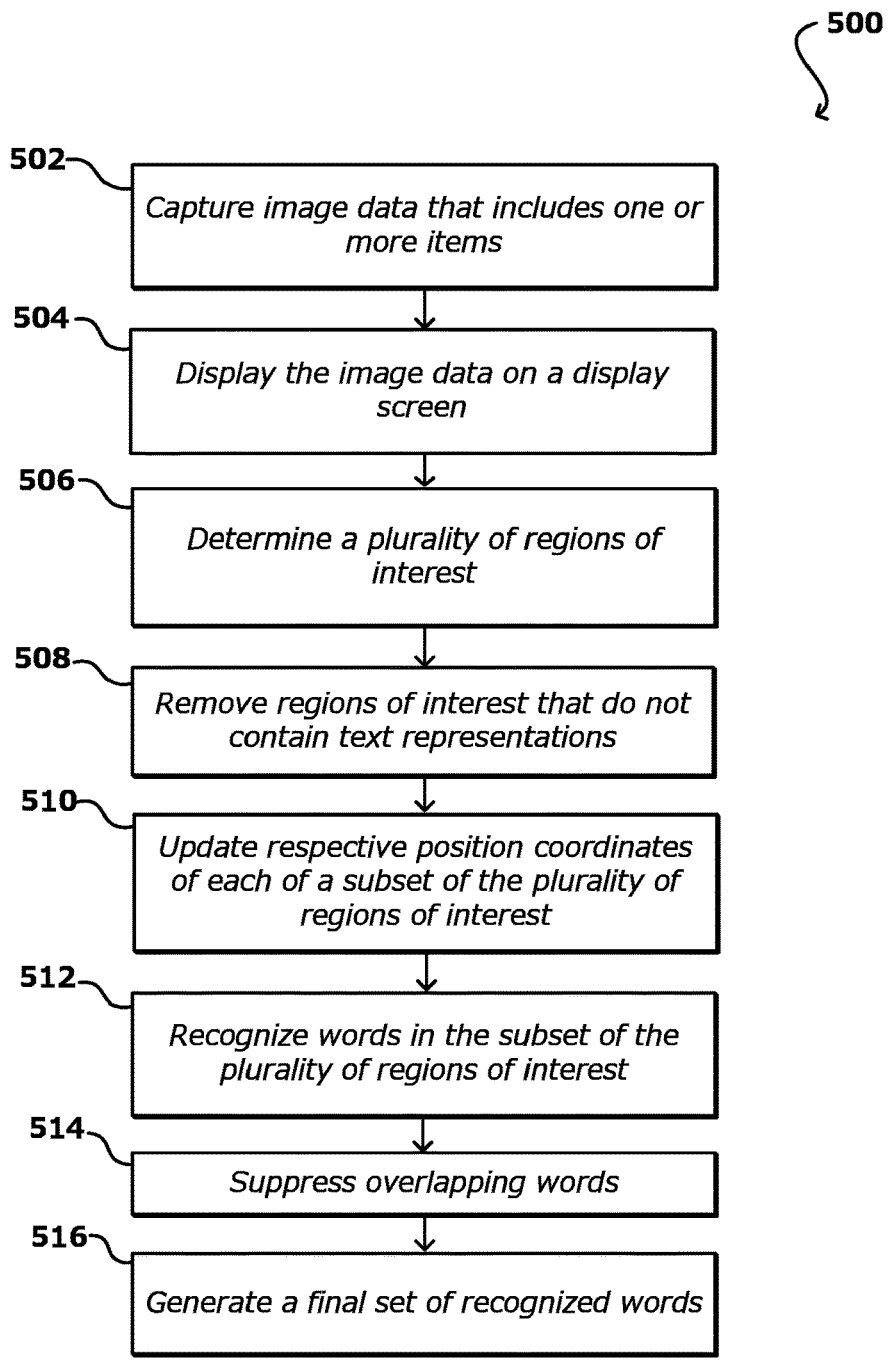
FIG. 5 illustrates an example process for text localization that can be utilized in accordance with various embodiments.

FIG. 5 illustrates an example process 500 for text localization that can be utilized in accordance with various embodiments. It should be understood that there can be additional, fewer, or alternative steps performed in similar or alternative orders, or in parallel, within the scope of the various embodiments unless otherwise stated. In this example, a camera of a computing device can be used to capture 502 image data of a live camera view of one or more items. The live camera view can be displayed 504 to the user on a display screen of the computing device. An application executing on the computing device (or at least in communication with the computing device) can analyze the image data of the live camera view to identify any text represented in the image data as well as determine locations or regions of the image that include the representations. For example, in accordance with various embodiments, region proposal techniques can be used on the image data to determine 506 a plurality of regions of interest, wherein each region of interest is associated with respective position coordinates and at least a portion of the regions of interest are overlapping. A trained filtering neural network can be used on the regions of interest to remove 508 regions that do not contain text representations to determine a subset of the plurality of regions of interest that do contain text representations. A trained regression neural network can then be used to update 510 respective position coordinates of each of the subset of the plurality of regions of interest to include text within a predetermined deviation. Once the positions of the regions of interest are updated, a trained word recognition neural network can be used on the subset of the plurality of regions of interest to recognize 512 words in the subset of the plurality of regions of interest. Overlapping words can be suppressed 514 using, for example, non-maximum suppression techniques and a final set of words can be generated 516. In accordance with various embodiments, the final set of words can be displayed. For example, the final set of words can be displayed in a popup window, in a side panel, as an overlay, in place of the recognized words, among other such display approaches. In another example, bounding boxes can be displayed on the display screen overlying an image generated using the image data, where each bounding box can include one of the recognized words. In yet example, the recognized words can be emphasized such as by applying visual effects to representations of the recognized words. This can include, for example, overlaying a graphical representation of the recognized words on the image data that varies in font size, color, font type, among other visual effects. In another example, the recognized words can be used to search for various items associated with the words, to provide information associated with the words, etc. For example, in the situation where the words are displayed to the user, the user can select one or more words to be used in a search query to obtain results related to the selected words.

Figure 6:
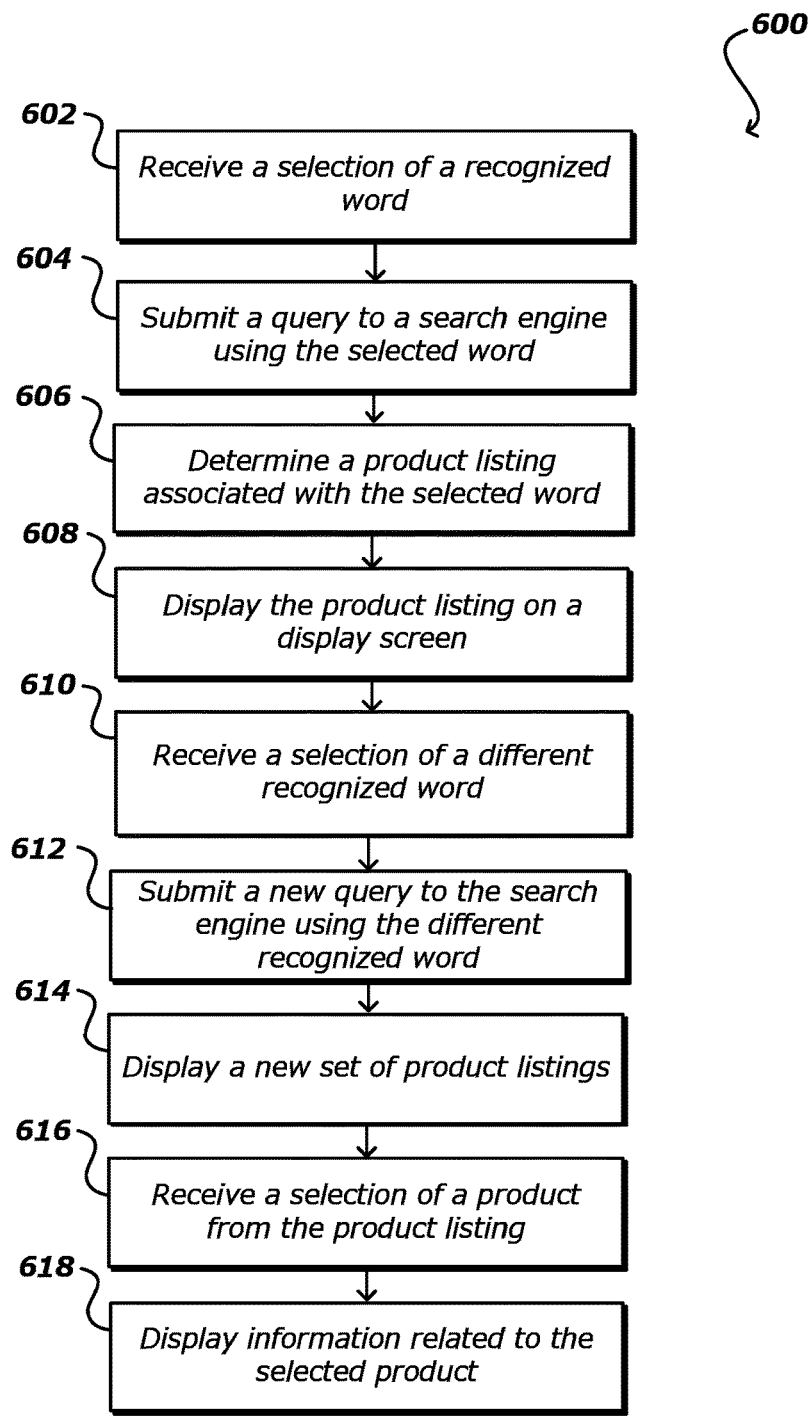
FIG. 6 illustrates an example process for performing a search in accordance with various embodiments.

FIG. 6 illustrates an example process 600 for performing a search in accordance with various embodiments. In this example, a selection of a recognized word is received 602. As described, the recognized word can be displayed in a number of different ways (e.g., a popup, a side panel, an overlay, etc.) The selected word can be used to submit 604 a query to a search engine. A product listing associated with the product(s) provided through an electronic marketplace can be determined 606 and displayed 608 on a display screen to a user. If the user wants a different set of product listings, the user can select 610 a different recognized word, which can cause a new query to be submitted 612 to the search engine with the different recognized word to display 614 a new set of product listings. Various other types of results can be returned as well as known for such purposes. Upon receiving 616, from the user, a touch (or other) selection of a product in the product listing, information for the selected product can be displayed 618, enabling the user to learn more about and/or purchase the product from the electronic marketplace through the portable computing device, among other such options.

Figure 7:
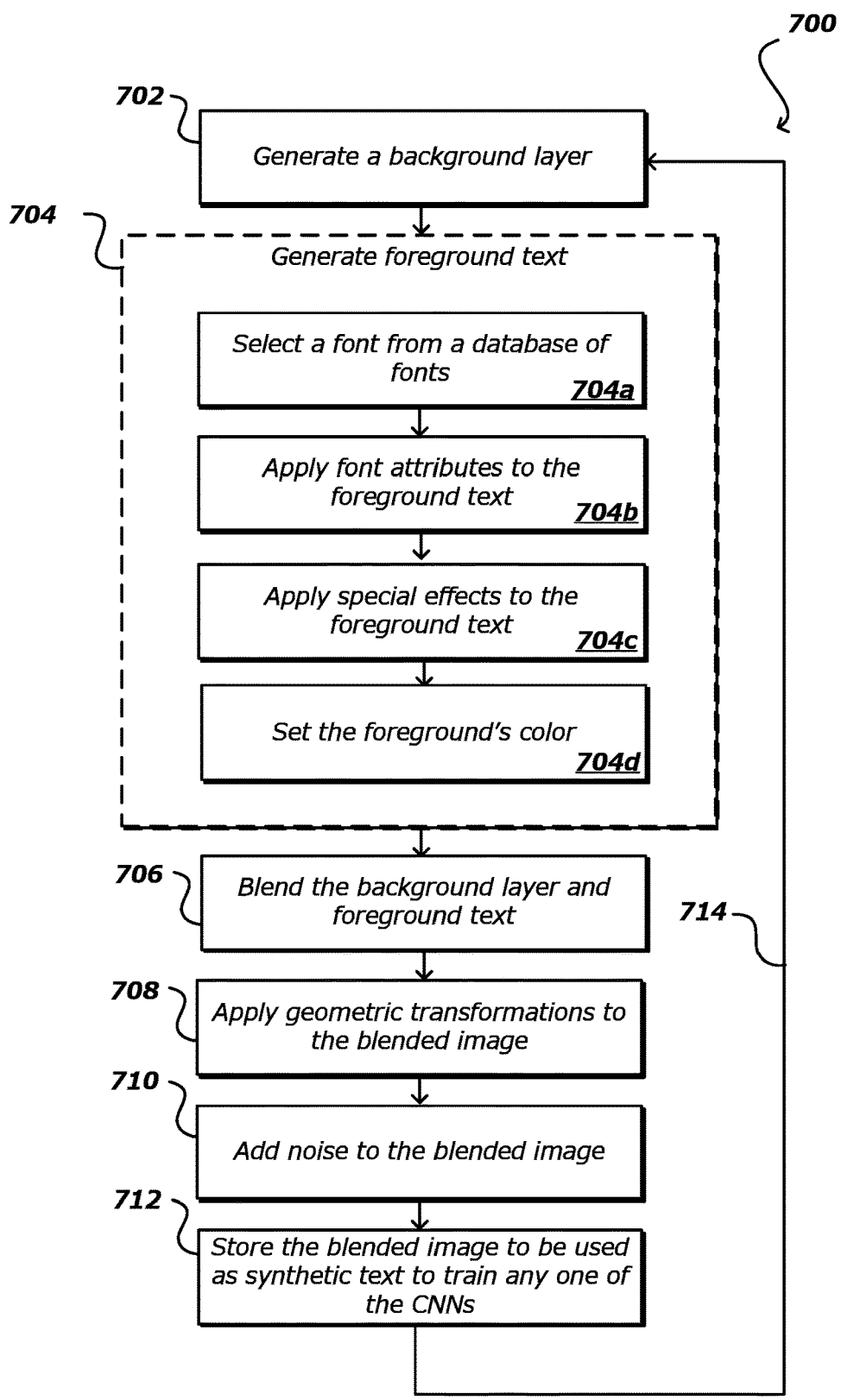
FIG. 7 illustrates an example process for generating synthetic text data in accordance with various embodiments.

FIG. 7 illustrates an example process 700 for generating synthetic text data in accordance with various embodiments. As described, synthetic text data can be used to train any one of the CNNs. An example training set can include approximately eight million images with an average of eighty images for each word. The word images can be generated with random font, attributes and background. Generating synthetic text data can include, for example, generating 702 a background layer. A background layer can include patches of random sizes selected from a database of images. The database of images can include images with clean simple patterns, smooth transition images, regular textures, natural texture and images. The background layer can be used as-is or undergo several iterations of blending with each other to get more a diversified mix. These patches are then resized to match the target output size. A foreground text can then be generated 704. Generating the foreground text can include selecting 704a (e.g., randomly selecting or selecting based on some criteria) a font from a database of fonts, applying 704b font attributes such as size, color, stroke width styles and kerning, etc. to the foreground text, applying 704c special effects such as bordering and shadowing effects at random scales, and setting 704d the foreground's color. The foreground color can be set randomly to a certain value or set transparent. The foreground text and background layer are blended 706 or otherwise merged. Blending between the foreground and background is accomplished either by alpha blending or by a composite operation selected from a bank of methods such bump map, colorize, multiply, saturate. In accordance with various embodiments, to model the imaging process's effects, geometric transformations such as perspective projection and arc/cylindrical distortions can be applied 708 to the blended image. After the foreground and background are blended, noise is added 710 to the final blended image, wherein the noise can include one or more of random noise, compression noise, artifacts, specular reflection, and lighting variation, among others into the final blended image. The final blended image can be stored 712 to a database to be used as synthetic text to, for example, train any one of the CNNs. The process can be repeated 714 to generate additional synthetic text.

Figure 8:
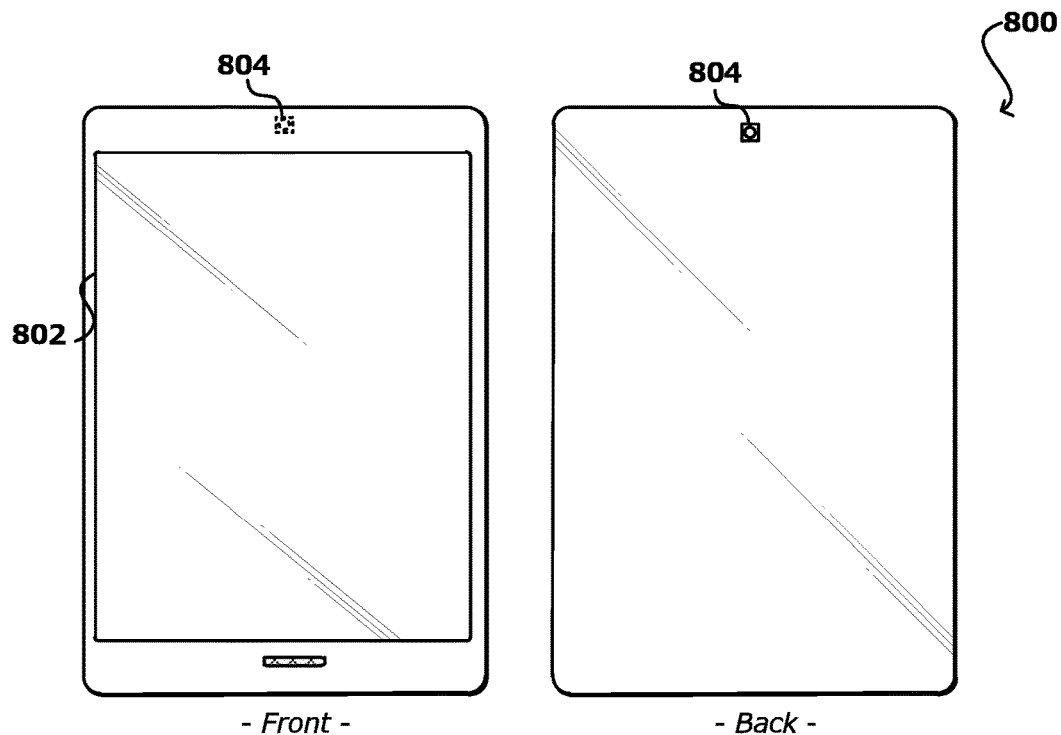
FIG. 8 illustrates front and back views of an example device that can be used in accordance with various embodiments.

FIG. 8 illustrates an example of a computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802, which under normal operation will display information to a user facing the display screen (e.g., on the same side of the computing device as the display screen). The computing device in this example can include one or more image capture elements, in this example including one image capture element 804 on the back side of the device, although it should be understood that image capture elements could also, or alternatively, be placed on the sides or corners of the device, and that there can be any appropriate number of capture elements of similar or different types. Each image capture element 804 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 9:
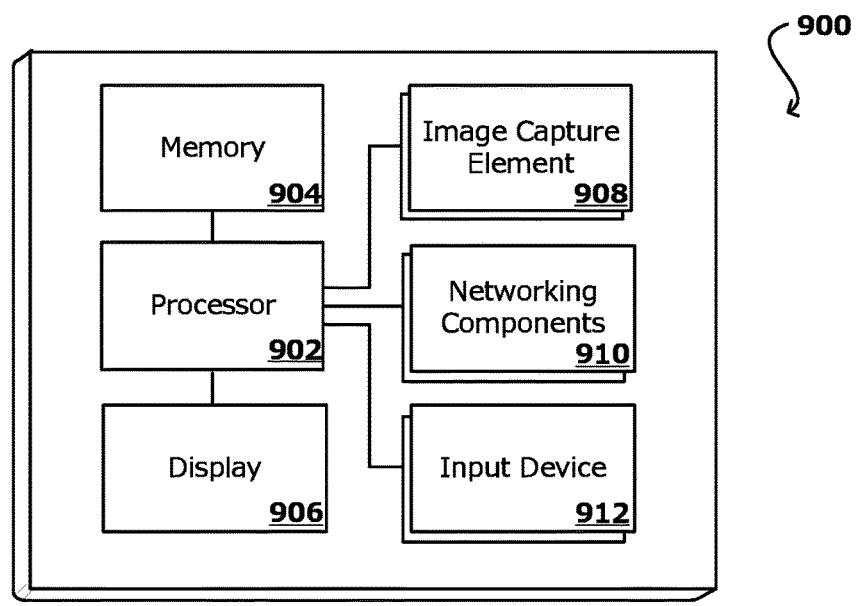
FIG. 9 illustrates example components of a client device such as that illustrated in FIG. 8.

FIG. 9 illustrates a set of basic components of a computing device 900 such as the device 800 described with respect to FIG. 8. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the processor 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 910 enabling the device to communicate with remote systems or services such as content providers and rights determining systems. These components can include, for example, wired or wireless communication components operable to communicate over a network such as a cellular network, local area network, or the Internet. The device can also include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    obtaining image data that includes representations of text;
    determining a plurality of regions of interest, a first set of the plurality of regions of interest including the representations of text and a second set of the plurality of regions of interest including potential representations of text;
    using a first trained neural network to identify the first set of the plurality of regions of interest;
    using a second trained neural network to update a position of each region of the first set of the plurality of regions of interest to include respective text representations within a predetermined deviation;
    using a third trained neural network on the first set of the plurality of regions of interest to recognize words associated with respective regions based at least in part on the respective text representations;
    receiving a selection of one of a recognized word from the list of recognized words;
    causing a query to be executed against a data source, the query including the recognized word;
    receiving, in response to the query, result information for a set of items, the set of items determined by comparing the word to a library of words, each word in the library of words associated with at least one item; and
    generating a list of recognized words.

2. The computer-implemented method of claim 1, further comprising:
    displaying, on a display screen of a computing device, the result information for the set of items.

3. The computer-implemented method of claim 2, wherein displaying the result information for at least a an item of the set of items includes switching to a result view, the results view including one of a price of the item, a rating of the item, images of the item, or additional information about the item.

4. The computer-implemented method of claim 1, further comprising:
    displaying a graphical outline for each recognized word, on a display screen overlying an image generated using the image data; and
    displaying, for a subset of graphical outlines, a label that indicates a word included in an associated graphical outline.

5. The computer-implemented method of claim 4, further comprising:
    receiving a selection of one of the labels, the selected label associated with a product offered through an electronic marketplace;
    receiving, in response to the selection, result information for the product; and
    displaying, on the display screen, the result information for the product.

6. The computer-implemented method of claim 1, further comprising:
    iteratively applying the second trained neural network and the third trained neural network to recognize the words to a threshold confidence level;
    identifying overlapping words; and
    removing the overlapping words to generate a final set of recognized words.

7. The computer-implemented method of claim 1, further comprising:
    training a neural network to detect regions of interest that do not contain text, wherein the trained neural network corresponds to the first trained neural network.

8. The computer-implemented method of claim 1, wherein the image data is analyzed using a region proposal component operable to determine the plurality of regions of interest, a region filtering component operable to determine a subset of the plurality of regions of interest, a region refining component operable to refine position coordinates associated with each of the subset of the plurality of regions of interest, a text recognizer component operable to recognize words in the subset of the plurality of regions of interest, and a post-processing component operable to suppress overlapping regions of interest to determine a final set of regions of interest.

9. The computer-implemented method of claim 1, wherein determining the plurality of regions of interest further includes:
    using object region proposal techniques to determine a first predetermined range of regions of interest;
    using text-specific region proposal techniques to determine a second predetermined range of regions of interest; and
    combining the first predetermined range of regions of interest and the second predetermined range of regions of interest to determine the plurality of regions of interest.

10. The computer-implemented method of claim 1, wherein the second trained neural network is operable to iteratively adjust a size of each region of the first set of the plurality of regions of interest to accommodate one or more words in their entirety, iteratively adjust a size of a region of the first set of the plurality of regions of interest to accommodate one or more word in their entirety, iteratively reposition a region of the first set of the plurality of regions of interest to accommodate one or more words in their entirety, or iteratively change a shape of a region of the first set of the plurality of regions of interest to accommodate one or more words in their entirety.

11. The computer-implemented method of claim 10, further comprising:
generating a background layer using portions of images from a database of images;
generating foreground text;
merging the background layer and the foreground text to generate a blended image; and
adding one or random noise or artifacts to the blended image to generate synthetic text data.

12. The computer-implemented method of claim 11, wherein the first trained neural network, the second trained neural network, and the third trained neural network is trained using synthetic text data.

13. A computing device, comprising:
at least one processor;
a camera configured to capture image data over a field of view;
a display screen; and
memory including instructions that, when executed by the at least one processor, cause the computing device to:
obtain the image data that includes representations of text;
determine a plurality of regions of interest, a first set of the plurality of regions of interest including the representations of text and a second set of the plurality of regions of interest including potential representations of text;
use a first trained neural network to identify the first set of the plurality of regions of interest;
use a second trained neural network to update a position of each region of the first set of the plurality of regions of interest to include respective text representations within a predetermined deviation;
use a third trained neural network on the first set of the plurality of regions of interest to recognize words associated with respective regions based at least in part on the respective text representations;
generate a list of recognized words;
receive a selection of one of a recognized word from the list of recognized words;
submit a query to a search engine using the recognized word as a query term; and
receive, in response to the query, result information for a set of items.

14. The computing device of claim 13, wherein the instructions when executed further cause the computing device to:
display, on the display screen, the result information for the set of items.

15. The computing device of claim 14, wherein the instructions when executed further cause the computing device to:
displaying a graphical outline for each recognized word, on a display screen overlying an image generated using the image data;
enable a user to adjust a shape of the graphical outline to generate an updated graphical outline; and
submit a new query to the search engine in response to a change in shape of the graphical outline, the new query including words included in the updated graphical outline.

16. The computing device of claim 13, wherein the instructions when executed further cause the computing device to:
displaying a graphical outline for each recognized word, on a display screen overlying an image generated using the image data;
display, for a subset of graphical outlines, a label that indicates a word included in an associated graphical outline;
receive a selection of one of the labels, the selected label associated with a product offered through an electronic marketplace;
receive, in response to the selection, result information for the product; and
display, on the display screen, the result information for the product.

17. A non-transitory computer-readable storage medium including instructions that, when executed by at least one processor of a computer system, cause the computer system to:
obtain image data that includes representations of text;
determine a plurality of regions of interest, a first set of the plurality of regions of interest including the representations of text and a second set of the plurality of regions of interest including potential representations of text;
use a first trained neural network to identify the first set of the plurality of regions of interest;
use a second trained neural network to update a position of each region of the first set of the plurality of regions of interest to include respective text representations within a predetermined deviation;
use a third trained neural network on the first set of the plurality of regions of interest to recognize words associated with respective regions based at least in part on the respective text representations; and
generate a list of recognized words;
display a graphical outline for each recognized word, on a display screen overlying an image generated using the image data; and
display, for a subset of graphical outlines, a label that indicates a word included in an associated graphical outline.

18. The non-transitory computer-readable storage medium of claim 17, wherein the instructions when executed further cause the computer system to:
receive a selection of one of a recognized word from the list of recognized words;
cause a query to be executed against a data source, the query including the recognized word;
receive, in response to the query, result information for a set of items, the set of items determined by comparing the word to a library of words, each word in the library of words associated with at least one item; and
display, on a display screen of a computing device, the result information for the set of items.

19. The non-transitory computer-readable storage medium of claim 17, wherein the instructions when executed further cause the computer system to:
receive a selection of one of the labels, the selected labels associated with a product offered through an electronic marketplace;
receive, in response to the selection, result information for the product; and
display, on the display screen, the result information for the product.

* * * * *